United States Patent [19]

Winsel

[11] 4,349,613

[45] Sep. 14, 1982

[54] METHOD AND APPARATUS FOR ELECTROCHEMICAL ENERGY PRODUCTION

[75] Inventor: August Winsel, Kelkheim, Fed. Rep. of Germany

[73] Assignee: Varta Batterie Aktiengesellschaft, Hanover, Fed. Rep. of Germany

[21] Appl. No.: 213,372

[22] Filed: Dec. 5, 1980

[30] Foreign Application Priority Data

Dec. 6, 1979 [DE] Fed. Rep. of Germany ....... 2949011

[51] Int. Cl.[3] .............................................. H01M 8/06

[52] U.S. Cl. ......................................... 429/17; 429/19

[58] Field of Search ........................ 429/17, 19, 9, 101

[56] References Cited

U.S. PATENT DOCUMENTS

| | | | |
|---|---|---|---|
| 3,338,746 | 8/1967 | Plust et al. | 429/9 |
| 3,539,395 | 11/1970 | Bartas | 429/17 |
| 4,081,693 | 3/1978 | Stone | 429/19 |
| 4,084,038 | 3/1978 | Scragg | 429/19 |

FOREIGN PATENT DOCUMENTS

| | | | |
|---|---|---|---|
| 51-1069132 | 6/1976 | Japan | 429/101 |
| 994448 | 6/1965 | United Kingdom . | |
| 1530214 | 10/1978 | United Kingdom . | |

*Primary Examiner*—Donald L. Walton

*Attorney, Agent, or Firm*—Weiser, Stapler & Spivak

[57] ABSTRACT

Combined operation between a lithium high-energy cell of the $Li/H_2O$ or $Li/H_2O_2$ system, a fuel cell, and if appropriate a storage battery can be carried out with favorable energy balance by producing on the one hand so much $CO_2$ using a methanol reformer in accordance with $$CH_3OH + H_2O \xrightarrow[300^\circ C.]{cat.} CO_2 + H_2$$

as is required for the combination of the LiOH created during the cell reaction in the Li cell into $Li_2CO_3$ and, on the other hand, obtaining $H_2$ which is supplied to the fuel cell together with $O_2$ from an $H_2O_2$ decomposer. The complete energy supply system contains a gas washer for the reaction of the $CO_2$ with the LiOH and is also equipped with a set of reservoirs for the various reactants, for Li, for methanol, for $H_2O_2$, for $H_2O$, for $H_2$ and for $O_2$. The current consumption of a motor used as load and the load equalization of the components among themselves is controlled by regulator devices.

7 Claims, 2 Drawing Figures

METHOD AND APPARATUS FOR ELECTROCHEMICAL ENERGY PRODUCTION

The invention relates to a method for electrochemical energy production from lithium high-energy cells having aqueous electrolytes and which operate in a combined system with hydrogen-oxygen fuel cells.

The further subject of the invention is a system which makes it possible to operate the combined system with a lithium high-energy cell and fuel cell, to which if appropriate a lead storage battery may also be added, with no loss and within an installation which is self-contained. Such an energy production installation of self-sufficient type is particularly suitable for ship propulsion.

Galvanic high-energy cells which operate on the basis of $Li/H_2O$ or $Li/H_2O_2$ are known from British Pat. No. 1,530,214. They consist of a highly reactive negative alkali metal electrode and a counter-electrode of inert metal, both of which are immersed in an aqueous electrolyte solution. As depolarizers at the counter-electrode, oxygen, hydrogen peroxide, or even water may be used. Special measures such as the creation of porous cover layers upon the negative electrode are taken in order to prevent an excessively strong effect of on and heat production.

If one considers an $Li/H_2O_2$ cell, the actual current producing reaction is given by the expression $$Li+\tfrac{1}{2}H_2O_2 \rightarrow LiOH\ (+\text{heat}+\text{electrical energy}). \quad (1)$$

At the same time parasitic reactions take place which are not electrochemically effective, namely $$Li+2H_2O \rightarrow LiOH \times H_2O+\tfrac{1}{2}H_2\ (\text{corrosion}), \quad (2)$$

$$H_2O_2 \rightarrow H_2O+\tfrac{1}{2}O_2\ (\text{Decomposition}) \quad 3)$$

If no oxidant such as $H_2O_2$ or $O_2$ is present then $H_2O$ is obliged to be the depolarizer and the reduction of the water liberates additional hydrogen.

$$H_2O+e^- \rightarrow OH^-+\tfrac{1}{2}H_2 \quad (4)$$

The operation of an aqueous galvanic high-energy cell is therefore not problem free. Nevertheless, intensive efforts are currently underway to open up for the above-mentioned electrochemical system suitable fields of use, e.g. as the energy source for ship propulsion. The theoretical rest potential of an $Li/H_2O_2$ cell indeed amounts to 3.93 volts and the energy density relative to lithium is 15,150 Wh/kg.

Accordingly, it has already been proposed in co-pending U.S. patent application Ser. No. 122,612, filed Feb. 19, 1980, which is assigned to the same assignee as the present application to decompose the $H_2/O_2$ gas mixture which unavoidably evolves in lithium high-energy cells into its components, and to supply these to a fuel cell in order to utilize the recombination energy inherent therein. According to this proposal, the gas mixture, if appropriate with the addition of oxygen, is supplied to the positive electrode of a fuel cell. From there, if appropriate with separation of excess oxygen, it is further ducted to the negative electrode of the fuel cell and is recombined into water with simultaneous production of electrical energy. The type of fuel cell which is particularly suitable for this recombination is the low pressure oxyhydrogen gas cell. It utilizes in its modern embodiments a positive electrode of sintered nickel with a special catalyst for the oxygen reduction. As negative electrode for the oxidation of the hydrogen there is suitable, for example, a double skeleton catalyst electrode of the type described in German Pat. No. 1,019,361 which is sintered from carbonyl nickel and highly active Raney-nickel powder. Both electrodes are respectively preceded by a gas space for the supply and distribution of the hydrogen or oxygen. The electrolyte, which is positioned between the double skeleton electrodes, is preferably caused to circulate.

In addition to these fuel cell electrodes, there are also in use other, pressure free working electrodes based upon nickel nets and catalyzed carbon powder, cf. A. Winsel in Ullmanns Encyklopädie der techn. Chemie, (English translation: Encylopedia of Technical Chemistry) Volume 12, p. 113 et seq. (1976).

Basically, one can proceed in such a manner that the gas mixture exiting from the lithium cell is supplied first to the $O_2$ electrode of the fuel cell where the oxygen is largely removed and the remaining gas then enters the $H_2$ electrode of the fuel cell. The operation of the fuel cell permits an electrochemical transformation of $H_2$ and $O_2$ only in the stoichiometric relationship of water. If $H_2$ is present in excess, this excess remains untransformed and must be expelled at the end of the fuel cell like an inert gas. If on the other hand $O_2$ is present in excess, this excess oxygen also enters the $H_2$ electrode of the fuel cell. It is a property of all $H_2$ electrodes that they also simultaneously electrochemically transform $O_2$ in short-circuit. In that case an $O_2$ excess is co-consumed in the $H_2$ electrode. This characteristic has a lowering effect upon the efficiency of the electrochemical energy transformation of the gas mixture in the fuel cell.

In a preferred embodiment of the proposed method, precautions are therefore taken with the object of supplying to the fuel cell the operating gases hydrogen and oxygen in an optimal relationship, namely in the stoichiometric relationship of water.

In the case of an $H_2$ excess this is done most simply by introducing into the gas mixture which flows to the $O_2$ electrode additional air, or $O_2$, which may, for example, stem from the decomposition of peroxide.

Alternatively, in the case of an $O_2$ excess, the $O_2$ is separated from the gas mixture so that only pure $H_2$ reaches the negative fuel cell electrode. In accordance with the invention a particularly suitable means for this separation has proven to be an electrochemical cell which functions on the principle of an $O_2/O_2$ gas chain and operates as "cleaning cell."

Lithium hydroxide which evolves in a lithium high-energy cell possesses limited solubility and therefore requires, if one wishes to store it for lithium recovery, a large volume because of the dilution water. However, through entrainment of liquid carbon dioxide, the lithium hydroxide may be bound into lithium carbonate and the solvent water which is thereby liberated can be returned to the circulation of the $Li/H_2O_2$ cell. In this manner, carbon dioxide is stored in the stoichiometric relationship of the lithium carbonate for use by the energy supply installation. However, in this process, the energy of neutralization is lost to the electrochemical energy production process through transformation into heat.

Accordingly, it is an object of the invention to provide a carbon dioxide source for neutralizing the lithium hydroxide created in the lithium cells. This source is supplied with carbon compounds, which contain the carbon in as reduced a form as possible, so that they can be made useful for the production of additional energy.

This and other objects which will appear are accomplished in accordance with the invention by reacting the lithium hydroxide, which forms during the cell reaction in the lithium cell, with a carbon dioxide to produce lithium carbonate. This is produced in a reformer from hydrocarbons or hydrocarbon compounds and water. The simultaneously produced hydrogen gas is supplied to the fuel cell.

The reforming of hydrocarbons or hydrocarbon compounds in accordance with the invention can be combined very appropriately with the current delivery from lithium high energy cells, if there is timely present as much carbon dioxide from the reformer as is required to neutralize the lithium hydroxide produced in the lithium cell.

In the particularly desirable methanol reforming method according to reaction formula (5) presented below, there are produced in the presence of a catalyst in endothermic reaction simultaneously 1 mole of carbon dioxide and 3 moles of hydrogen gas per mole of methanol. The hydrogen gas can be supplied to a fuel cell for the production of electrochemical energy. An additional mole of hydrogen is added when the lithium high energy cell is operated as a lithium/water cell in accordance with the reaction formula (6), in which the 2-g atoms of lithium become 2 moles of lithium hydroxide, which are united into lithium carbonate by the carbon dioxide which is produced stoichiometrically from 1 mole of methanol in accordance with the reaction formula (5).

As a reaction partner for the hydrogen in the fuel cell, oxygen can be produced, for example, from liquefied oxygen, but preferably according to the reaction formula (7) through hydrogen peroxide decomposition, so that the overall reaction formula (8) applies for the overall process.

$$CH_3OH + H_2O \xrightarrow[300^\circ\,C.]{cat.} CO_2 + 3H_2 \quad (5)$$

$$2\,Li + 2\,H_2O \longrightarrow 2\,LiOH + H_2 \quad (6)$$

$$4\,H_2O_2 \longrightarrow 2\,O_2 + 4\,H_2O \quad (7)$$

$$2\,Li + CH_3OH + 4\,H_2O_2 \longrightarrow Li_2CO_3 + 6\,H_2O \quad (8)$$

The volume of the substances on the left side and their weights determine the energy weight of the reaction substances for the process.

If the reaction formula (8) is used, it must be noted that this is an overall reaction. The process technology, however, requires that the hydrogen peroxide be stored in, for example, 70% by weight form, so that the overall reaction expression (9) has to be considered for practical use:

$$2Li+CH_3OH+4(H_2O_2+0.81H_2O) \rightarrow Li_2CO_3+9.24H_2O \quad (9)$$

For such as system there are obtained as the theoretical energy density the following values:

Realizable electrical energy at 1.9 V cell potential in the $Li/H_2O$ cell per formula transformation $$E_1=102\ Wh,$$

at 0.8 cell potential in the fuel cell $$E_2=171\ Wh,$$

therefore, together, $$E=E_1+E_2$$

$$E=273\ Wh.$$

Relative to the weight of the stored reaction substances per formula G=240 g, i.e. at the volume of V=216 cm$^3$, the important specific values, without taking the transformations into account are $$(E/G=1.14(kWh/kg)$$

$$(E/V=1.26(kWh/m^3)$$

The reaction heat $\Delta H$, which is created by the reaction according to formula (9) is $\Delta H$=516 Wh per formula transformation.

Accordingly the efficiency is $$\eta=(273/516)=53\%$$

For the practical performance of the process embodying the invention, there is provided apparatus which includes in combination the following essential elements: a lithium high energy cell with aqueous electrolyte, followed by a hydrogen/oxygen fuel cell, a reformer for obtaining hydrogen/carbon dioxide mixtures from hydrocarbons or hydrocarbon compounds and for neutralizing the lithium hydroxide of the lithium cell by means of the carbon dioxide in the reformer gas, and a gas washing device.

For further details, reference is made to the discussion which follows, in light of the accompanying drawings, wherein.

Figure 1:
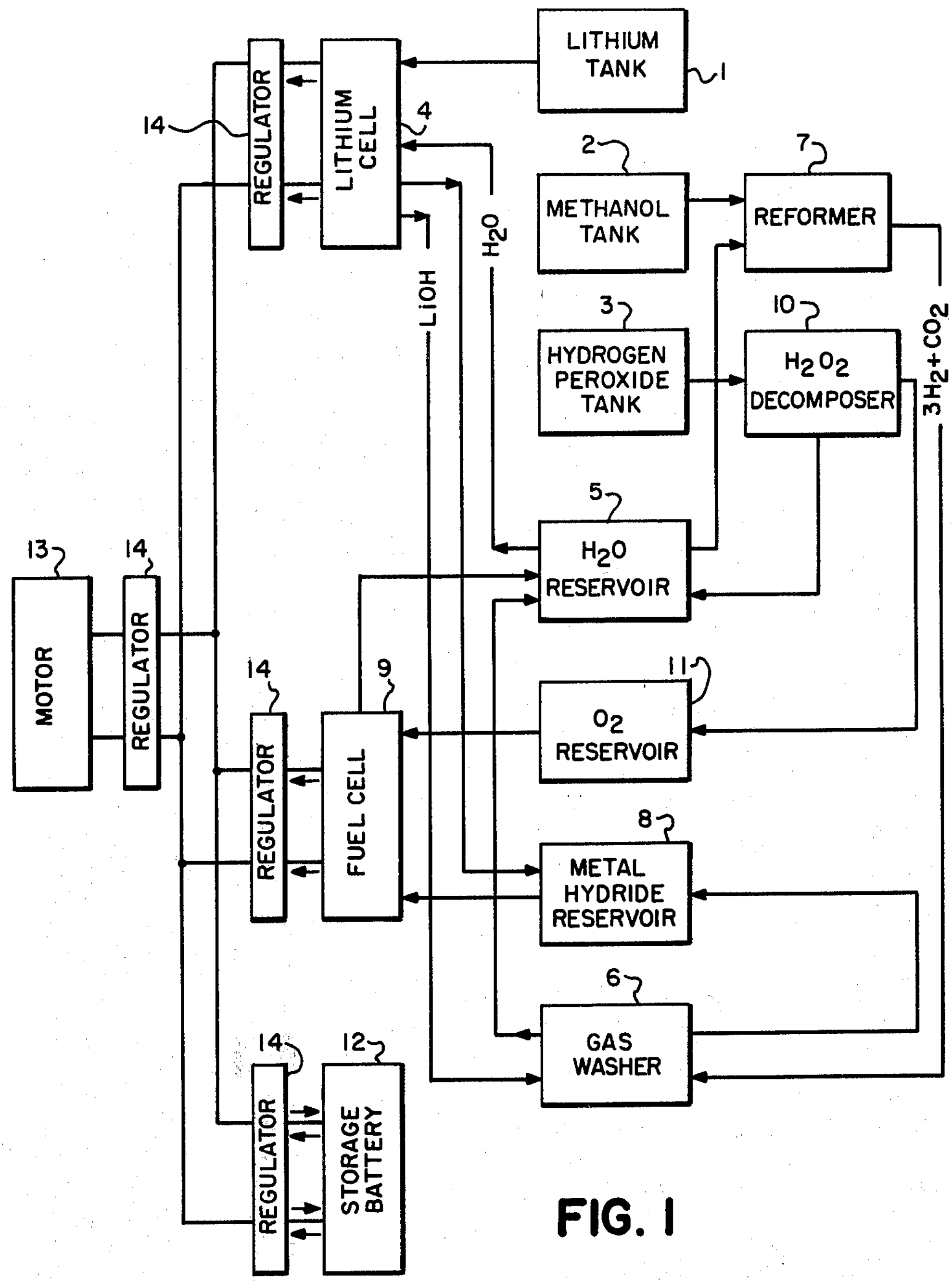
FIG. 1 shows the installation in diagrammatic form, by means of which the raw material and energy flow can be visualized.

As illustrated in FIG. 1, the lithium tank 1, the methanol tank 2 and the hydrogen peroxide tank 3 contain the raw materials. The lithium is caused to electrochemically react in the lithium cell 4 together with $H_2O$ from an $H_2O$ reservoir 5. An apparatus suitable for this purpose is known (cf. E. L. Littauer, W. R. Momeyer and K. C. Tsai, Journal of Power Sources 2 (1977/78), pages 163–176).

The reaction in the lithium/$H_2O$ cell is characterized by heat loss, which can be seen from the fact that, in lieu of the theoretical potential of 2.23 V for the lithium/$H_2O$ cell, one can count only on a load potential of 1.9 V. For the removal of this heat, as well as for matching the electrolyte flow to the output required from the cell, the lithium/$H_2O$ cell is provided with electrolyte circulation. In addition, to remove the lithium hydroxide reaction product, water, also from $H_2O$ reservoir 5, must be supplied and concentrated LiOH solution must be removed.

This excess solution is supplied to a gas washer 6 in accordance with the invention, and is there brought into contact with the hydrogen/carbon dioxide mixture produced in reformer 7. This produces pure hydrogen and lithium carbonate which settles out in the gas washer 6 and remains there, whereas the separated water is returned to the $H_2O$ reservoir 5. After passing through the gas washer 6 the hydrogen is, if appropriate, stored in a metal hydride reservoir 8 or in a pressure flask or in the low pressure piping itself, before being supplied to the fuel cell 9.

The oxygen for the fuel cell is derived from the hydrogen peroxide tank 3 via the $H_2O_2$ decomposer 10 and the $O_2$ reservoir 11.

Such a combined electrochemical energy supply system can be operated completely self-sufficiently without supply or removal of reagent. It is therefore particularly suitable for submarine travel or for energy supply installations in similar situations.

As appears from the diagram of FIG. 1, it is possible to temporarily remove the lithium cell from the working combination and to maintain only the fuel cell in operation for current supply. The fuel cell is then alone supplied with hydrogen from the reformer 7 and oxygen from the $H_2O_2$ decomposer 10. However, over extended periods, the operating stages and the overall material transformation in the installation should be so matched to each other that the stoichiometry of the overall reaction formula (8) or (9) is met.

In FIG. 1 there is further indicated the possibility of parallel operation of lithium cell and fuel cell with a storage battery 12. For load equilization of the current sources among themselves, as well as for load control of motor 13, regulators 14 are provided.

In contrast to the reaction (6) in the lithium cell, the reaction (5) in the reformer is endothermic, i.e. a gas mixture is produced from methanol and water which consumes 16.25 Wh/formula of heat. As is seen from expression (5), the gas volume doubles during the reaction in the reformer, i.e. the reaction is accompanied by a swelling flow and this again indicates that it can occur only in thin layers of the catalyst. Of course this reaction proceeds the better the less resistance is met by the flow of the reaction heat to the place of reaction. It has been found that this reaction proceeds especially well with catalysts which contain copper chromite embedded in a copper frame, in the manner of a double skeleton structure and pressed, or rolled, or possibly sintered upon a sheet-like carrier.

Figure 2:
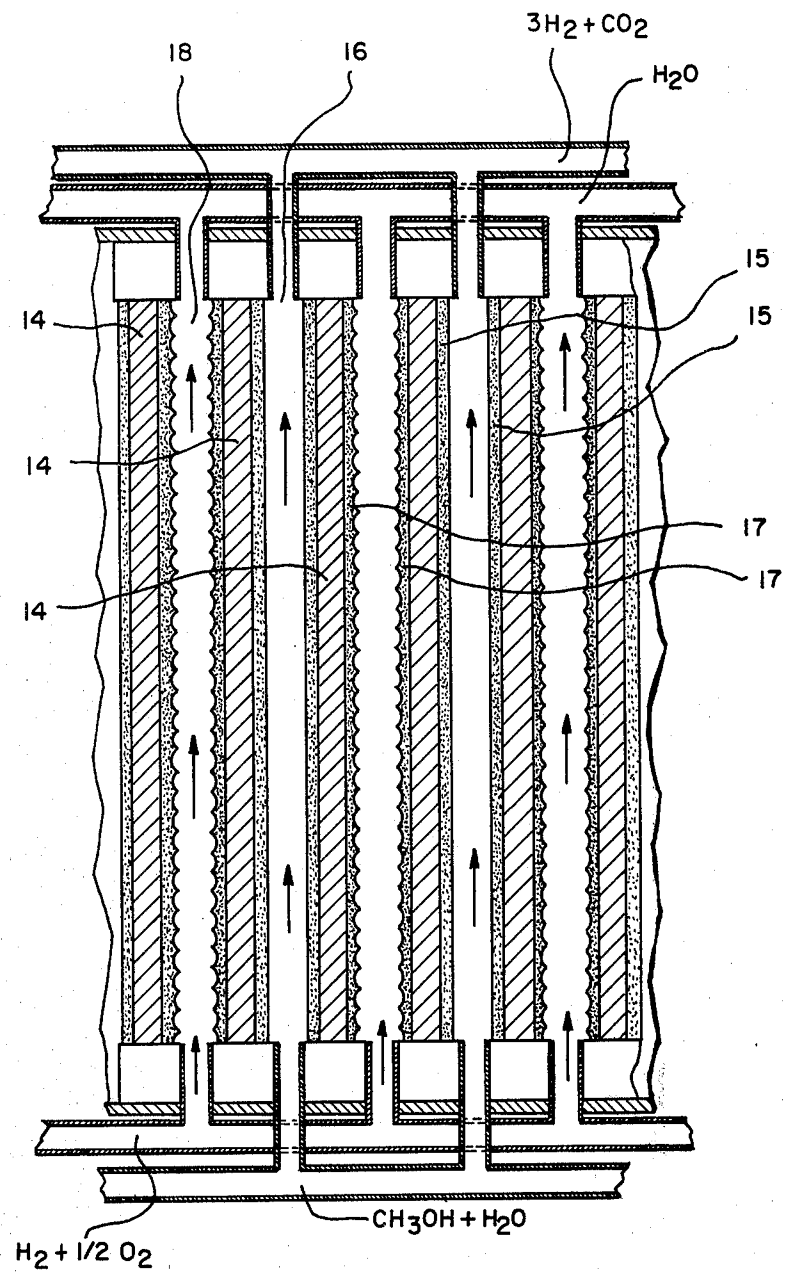
FIG. 2 shows the details of the reformer.

The reverse side of this plate serves to supply the heat and this can be accomplished advantageously, for example, in that the reverse side is provided with a recombination mat for hydrogen and oxygen and an oxyhydrogen gas mixture is permitted to react there. It is particularly desirable if the very pure hydrogen from the lithium/water cell is used for this purpose and, for example, the recombination gas is controlled by the temperature of the reformer 7. A desirable structure for this purpose involves a register-like arrangement of plates 14 according to FIG. 2 in which two reformer layers 15 in confronting position define the reforming space 16 and two recombination catalysts 17 in confronting position define the recombination space 18.

In place of the recombination heat of the hydrogen/oxygen mixture, the heat can also be obtained from the decomposition heat of the hydrogen peroxide of 110 Wh per formula quantity in formula (3). For this purpose there is brought into thermal contact the hot $O_2$ gas from the catalytic $H_2O_2$ decomposer 10 with the reforming catalyst of the reformer layers 15, or, the recombination space 18 is made into a decomposition space for hydrogen peroxide of such configuration that the reverse sides of the reforming catalyst bearing plates 14 contain a layer which is catalytically effective for the hydrogen peroxide decomposition. Catalytically effective in this sense are, for example, $MnO_2$ or silver catalyst particles which have been embedded in a porous sintered nickel layer, or in the manner of the double skeleton (DSK) process. Here, too, it is desirable to a hydrogen reservoir in-between because, although all the reactions in this process take place in suitable sequence, it is desirable to provide the possibility of phase displacement through the in-between connection of reservoirs.

To the extent that, in place of the preferred methanol, higher alcohols as well as cyclic and aliphatic carbohydrates can be made useful as hydrogen sources by a reforming process, this applies only with the limitation that the reforming temperatures for long chain hydrocarbons are substantially higher. On the other hand, in these cases a higher density is obtained during storage.

Further heat utilization is possible by using the heat for the evaporation and preheating of the reformer mixture consisting, for example, of methanol and water.

The previously mentioned values for energy density apply without the various energy transformers. There, weight and volume are again dependent upon the required output. The specific values for the overall aggregate become optimal when the $Li/H_2O$ cell, the methanol reformer, and the fuel cell are adjusted for medium performance and when peak performance is obtained by combination thereof with a lead storage battery. This method of operation corresponds to the diagrammatic illustration of FIG. 1.

In hydrogen peroxide, the hydrogen is stored with high density. It can also be readily split off from this compound and supplied via a piping system to the fuel cell and if appropriate, to the lithium cell provided their cathodes are constructed as oxygen cathodes. However, instead of from the hydrogen peroxide, the installation can also be supplied with oxygen from a liquefied gas, cold evaporator, the automatic matching of the gasification performance to the demand being within the state of the art.

If the Li/water cell is operated with a hydrogen cathode instead of an oxygen cathode, then its useful voltage is about 0.7 V higher. On the other hand, the corresponding energy yield detracts from the reaction in the fuel cell, which now has available only the hydrogen from the reformer and the relatively small quantity of hydrogen which was formed parasitically at the Li anode without current production. The fuel cell can then indeed be made somewhat smaller, but this is at the expense of a complicated reaction process in the $Li/H_2O$ cell.

I claim:

1. Process for electrochemical energy supply from lithium high energy cells with aqueous electrolytes which operate in a combined system with hydrogen/oxygen fuel cells and which form lithium hydroxide by the cell reaction in the lithium cell, the process comprising producing in a reformer carbon dioxide and hydrogen gas from hydrocarbons or hydrocarbon compounds and water, transforming the carbon dioxide and the lithium hydroxide into lithium carbonate, and supplying the hydrogen gas to the fuel cell.

2. The process of claim 1 which comprises producing in the reformer on a timely basis as much carbon dioxide as is required for neutralizing the lithium hydroxide formed in the lithium cell.

3. The process of claim 1 which comprises utilizing alcohols as the hydrocarbon compounds.

4. The process of claim 3 wherein the alcohol is methanol.

5. The process of claim 1 which comprises temporarily storing hydrogen and oxygen gas prior to being supplied to the fuel cell.

6. The process of claim 1 wherein the reforming process is endothermic and is sustained by supplying heat by an oxyhydrogen gas recombination, or by hydrogen peroxide decomposition.

7. Apparatus for performing the process of claim 1 which apparatus comprises a lithium high energy cell with aqueous electrolyte,
an after-connected hydrogen/oxygen fuel cell,
a reformer for producing hydrogen/carbon dioxide mixtures from hydrocarbons or hydrocarbon compounds, and
a gas washing apparatus for neutralizing the lithium hydroxide from the lithium cell by the carbon dioxide of the reformer gas.

* * * * *